(12) United States Patent
Subramanian et al.

(10) Patent No.: US 6,927,081 B2
(45) Date of Patent: Aug. 9, 2005

(54) METHOD OF INKLESS WAFER BLIND ASSEMBLY

(75) Inventors: Balamurugan Subramanian, Plano, TX (US); Sreenivasan K. Koduri, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 190 days.

(21) Appl. No.: 10/422,545

(22) Filed: Apr. 24, 2003

(65) Prior Publication Data

US 2004/0215417 A1 Oct. 28, 2004

(51) Int. Cl.⁷ ............................ G01R 31/26; H01L 21/66
(52) U.S. Cl. ........................................................ 438/14
(58) Field of Search ............................ 438/14, 15, 460, 438/462, 465; 702/157; 29/709, 832, 833, 407.01, 407.04, 407.05, 407.09; 156/344

(56) References Cited

U.S. PATENT DOCUMENTS

| | | | |
|---|---|---|---|
| 5,773,315 A | * | 6/1998 | Jarvis ............................ 438/14 |
| 5,811,314 A | * | 9/1998 | Chen et al. ..................... 438/18 |
| 6,682,948 B2 | * | 1/2004 | Wada ............................ 438/17 |
| 6,756,796 B2 | * | 6/2004 | Subramanian .............. 324/750 |
| 6,763,578 B2 | * | 7/2004 | Farnworth et al. ............ 29/833 |
| 6,767,803 B2 | * | 7/2004 | Tsujimoto .................... 438/460 |

* cited by examiner

Primary Examiner—David A. Zarneke
(74) Attorney, Agent, or Firm—W. James Brady, III; Frederick J. Telecky, Jr.

(57) ABSTRACT

A method of blind assembly processing a wafer by pick and place equipment is described. This method includes determining the wafer diameter or radius and determining the bad die edge exclusive zone. This determined diameter or radius and the determined edge exclusive zone is used to make a black paper mask and place it over the wafer or to cut or saw away from the wafer the bad die edge exclusive zone. This enables the pick and place equipment to avoid the bad dies in the bad die edge exclusive zone.

15 Claims, 8 Drawing Sheets

*FIG. 15*  INKED DIE

*FIG. 16*

METHOD OF INKLESS WAFER BLIND ASSEMBLY

FIELD OF INVENTION

This invention relates to a method of inkless wafer blind assembly in pick and place equipment.

BACKGROUND OF INVENTION

The wafermap process eliminates the inking of reject dies at the wafer fab by using the map data available from a probe test to position the wafer to exact location of all the good die on the Die Bonder or Tape and Reel.

In all wafers, edge dies are almost always bad and usually marked as bad without testing. In small die wafers (for example 25×25 mils), wafer mapping is difficult due to old equipment capability, the wafer will be inked before processing the wafer in pick and place equipment. Because of high yield wafers, almost all the bad dies are edge dies. With small die wafers having high chips per wafer count (50,000 dies) and if the wafer yield are high then inking on the edge of the wafer is more time consuming and not cost effective. Sometimes it is very difficult to even ink in the center. In order to avoid inking edge dies, blind assembly process is used.

Blind assembly process is a process of assembling dies from inkless wafers without using wafer mapping. Some blind assembly processes exist in some new or old pick and place equipments but not all pick and place equipments. The existing blind assembly process tool is a software tool.

It is highly desirable to provide a new blind assembly process that will eliminate inking in small wafers and will work in any pick and place equipment.

It is further desirable to provide a method that will provide a blind assembly process for three types of wafers. The first is a Type I wafer with no inking indicating a bad die. The second is a Type II wafer with no ink in the edge exclusive zone dies and ink dies (reject dies) in the rest of the wafer. The third type is Type III where all bad dies are already inked.

SUMMARY OF INVENTION

In accordance with one embodiment of the present invention after determining the wafer diameter and the edge die areas the steps of: forming a mask ring to mask the edge dies area, placing the mask on the wafer to cover the edge dies and running pick an place equipment such that whenever the equipment reaches the edge of the mask, the vision system in the pick and place equipment recognized the mask as no die or ink die or partial die and skip/ turnaround the row/column.

In accordance with another embodiment of the present invention after determining the wafer diameter and the edge die areas the steps of: cutting the wafer such that all edge dies are eliminated.

DESCRIPTION OF PREFERRED EMBODIMENTS

Figure 1:
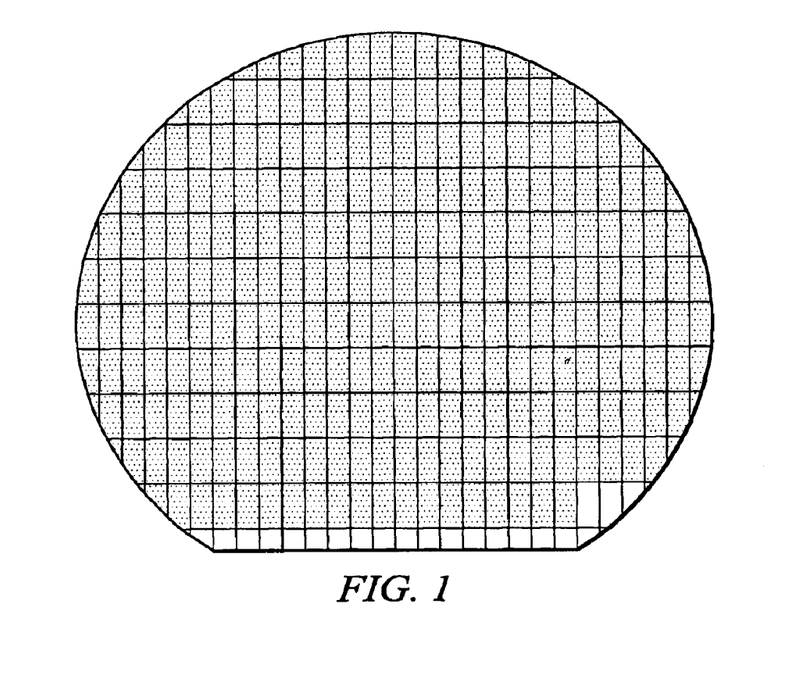
FIG. 1 illustrates a sawn 6" wafer on a flex frame.

Referring to FIG. 1 there is illustrated a sawn 6-inch wafer on a flex frame. The wafer is an almost circular disc except for the flat edge. The horizontal lines parallel to the flat edge are the horizontal cuts separating the rows of dies and the vertical lines perpendicular to the flat edge form the columns of dies. The gray areas illustrate the patterned dies.

Figure 2:
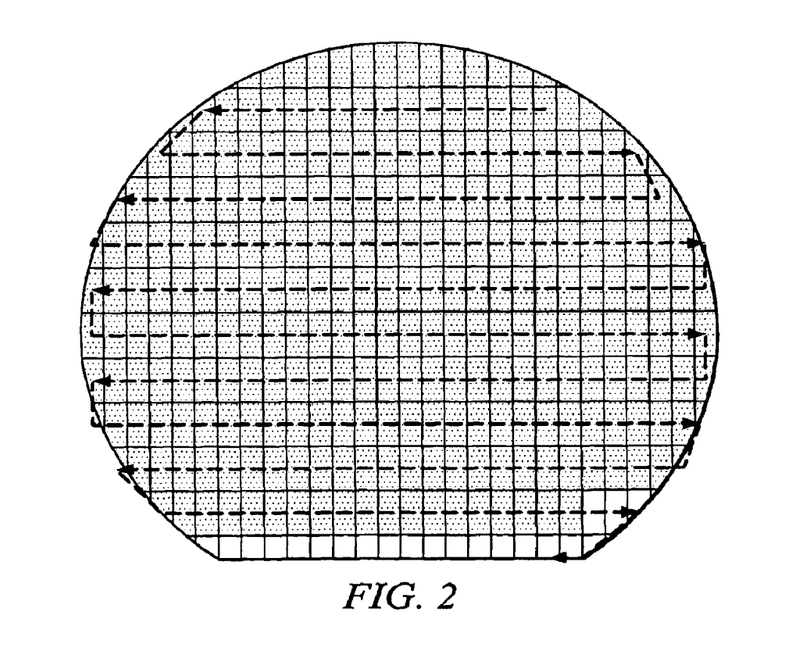
FIG. 2 illustrates a normal pickup sequence according to the prior art.

The wafer diameter of the mounter is set to 6 inches or a radius of 3 inches. FIG. 2 illustrates the pickup sequence of the dies in the wafer. The pick up sequence starts at the top right and first moves die by die to the left until it hits an edge and then goes down to the second row and then proceeds to the right until it reaches the edges and then it drops down one row and moves to the left. The process is repeated going to the left to the left edge and then dropping down one row and going right to the right edge again and then dropping down again. This process continues row by row until all the wanted dies are picked up and mounted to a lead frame. The wafer table will turnaround if the wafer table tries to move beyond the wafer diameter or radius.

Figure 3:
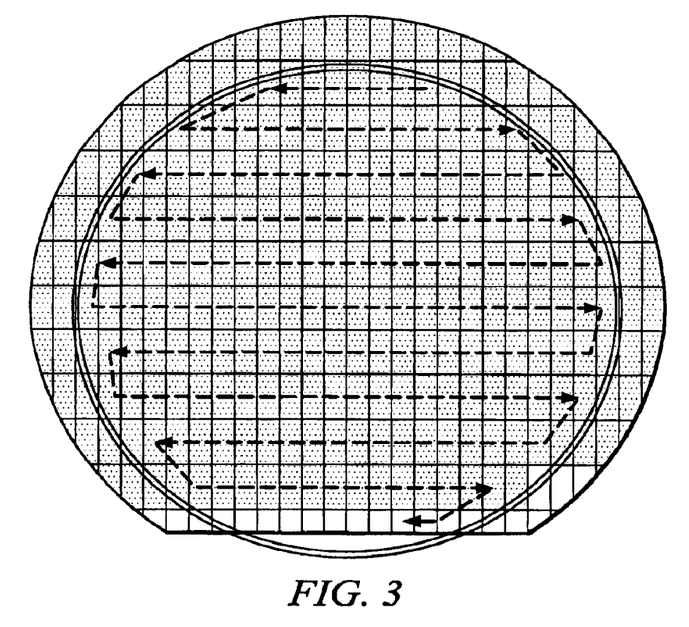
FIG. 3 illustrates a method to prevent edges from being picked up by setting the wafer diameter of the mounter to be 6-X inches.

A method to prevent the edge dies from being picked up is provided in the prior art by setting the wafer diameter of the mounter to be 6-X inches or radius 3-X/2 inches. See FIG. 3. The X/2 inches are the length of the bad edge die. The pickup sequence of the dies will then follow the sequence illustrated in FIG. 3 where the centered double ring represents the undersized mounter diameter. The wafer table will turn around if the wafer table tries to move beyond the wafer diameter or radius. The result is the pick up dropping down to the next row before reaching the bad edge dies.

Figure 4:
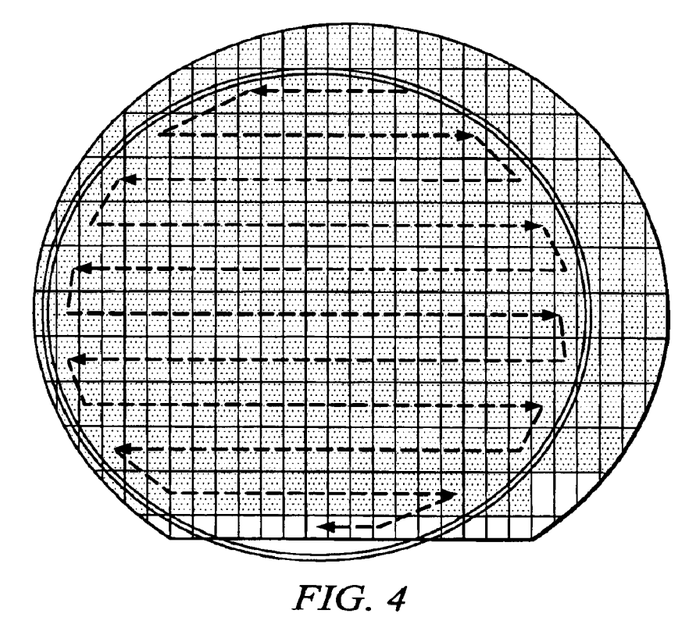
FIG. 4 illustrates the pickup sequence of the dies in the wafer if the wafer is mounted to the left of the center of the flex frame.
Figure 5:
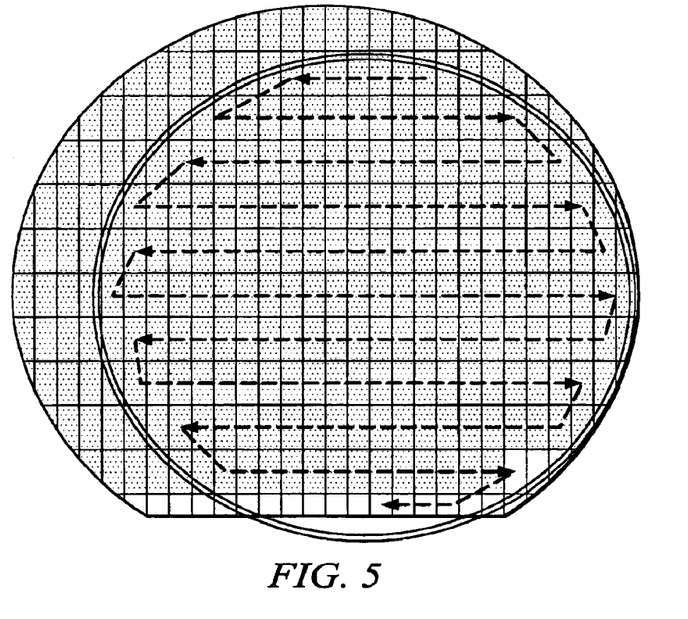
FIG. 5 illustrates the pickup sequence of the dies in the wafer if the wafer is mounted to the right of the center of the flex frame.

This method, however, is dependent on the wafer being mounted on the center of the flex frame. That has been a problem. It is not easy to determine the center correctly and has been difficult to center because of movement of wafer on flex frame or wafer table may move. FIG. 4 illustrates the pickup sequence of the dies in the wafer if the wafer is mounted to the left of the center of the flex frame. The pickup sequence will pick up the bad edge dies on the left and leave good dies on the right. FIG. 5 illustrates the pickup sequence of the dies in the wafer if the wafer is mounted to the right of the center of the flex frame. The pickup sequence will pick up the bad edge dies on the right and leave good dies on the left. Applicant's teaching herein avoids this kind of situation.

Method 1

Figure 6:
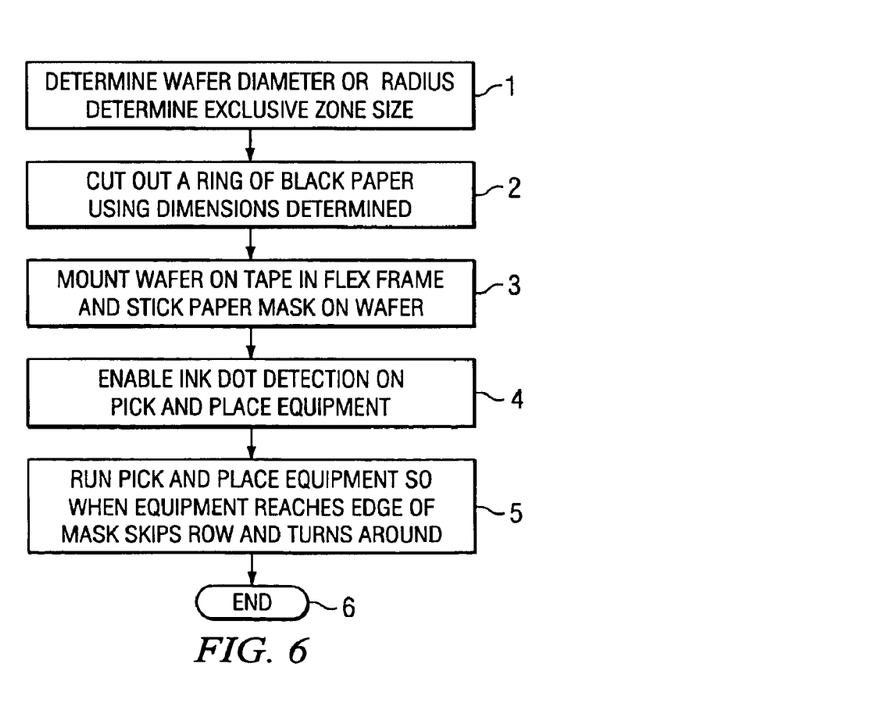
FIG. 6 is a flow diagram of Method 1 according to one embodiment of the present invention.

FIG. 6 illustrates Method 1 in accordance with one embodiment of the present invention.

Figure 7:
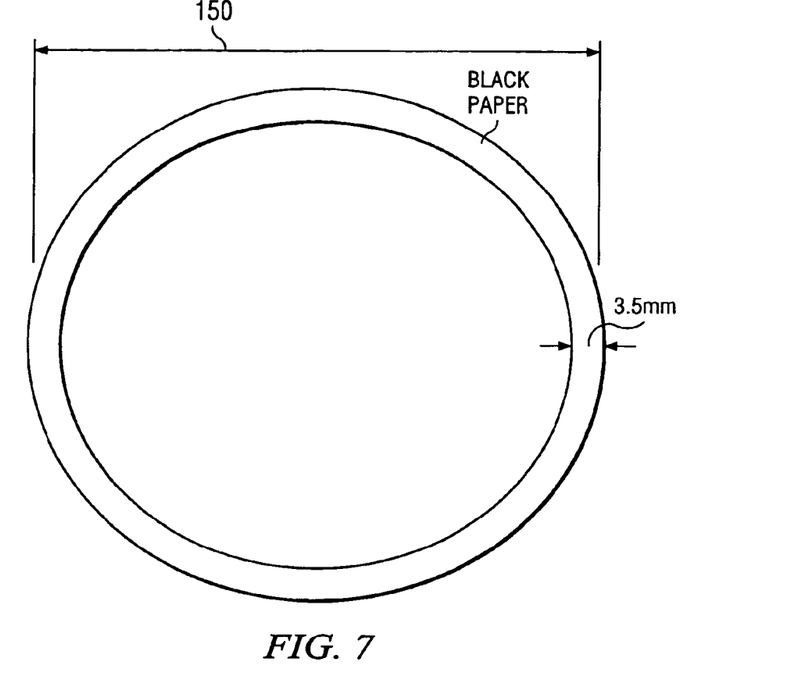
FIG. 7 illustrates the wafer diameter and the edge exclusive zone and the cut out of a carbon leaf black color paper or other clean room black paper in such a way that the paper masks the edge of the edge exclusive zone or the edge ink die or bad edge die area.

Step 1 determines the following two information items are required before processing a wafer:
1. Wafer diameter (for example 150 mm or 200 mm).
2. Edge exclusive zone size in mils or mm from edge of wafer to an inner circle where good dies begin. It is the zone of the bad edge dies which dies would be inked if processes in that manner. For the example this is 3.5 mm. See FIG. 7.

Step 2 is to cut out or otherwise form a ring of a Carbon Leaf black color paper or other clean room black paper using the determined dimensions in such a way that the paper when mounted on the wafer masks the edge exclusive zone where the bad edge dies are located. The outer edge of the ring is made for the 150 mm diameter wafer 150 mm in diameter and the inner edge of the ring is made 150−(2×3.5) or 143 mm diameter. The radius of the inner edge is 71.5 mm. See FIG. 7.

Figure 8:
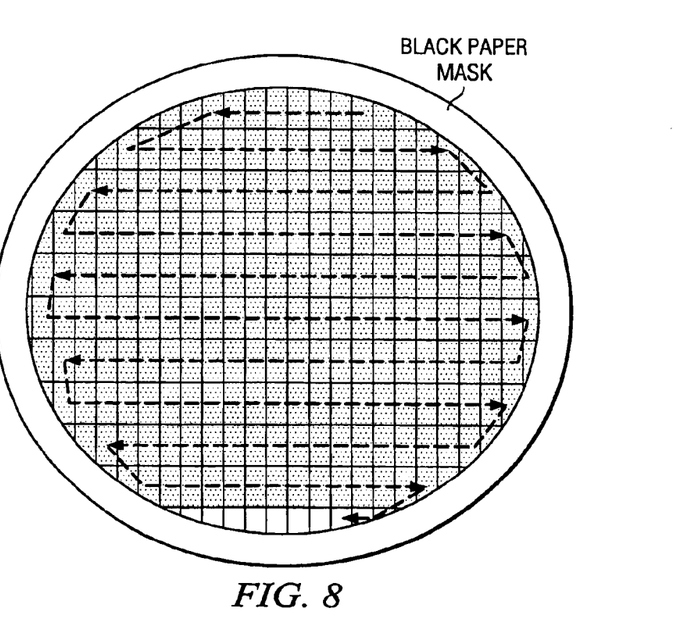
FIG. 8 illustrates the wafer mounted on tape in flex frame with the paper mask on the wafer and the skip/turnaround the row/column at the mask edges.

Step 3 is to mount wafer on tape in flex frame as per normal operation and stick the paper mask in the shape of a ring on the wafer. Currently, normal tape is used to stick the paper ring. One end of the sticking tape is on the paper ring and the other end is on the flex frame tape. The outer edge of the paper ring is aligned with the outer edge of the wafer. For example, the wafer size is 150 mm. The carbon Leaf black paper is cut to the same size of 150 mm. The second cut of the paper is to mask the edge exclusive zone. Since the maximum size of the Carbon leaf black paper is the same as the wafer maximum size then the mask is laid down over the wafer so both will align. See FIG. 8.

Step 4 is to enable the ink dot detection on pick and place equipment.

Step 5 is to start running the pick and place equipment as normal. Whenever the pick and place equipment reaches the edge of the paper mask, the vision system in the pick and place equipment recognize the mask as an ink dot or no die or partial die and skips to the next row and reverses direction (skip/turnaround the row/column). Follow the dashed lines and arrows in FIG. 8.

Step 6 END.

Method 2

Figure 9:
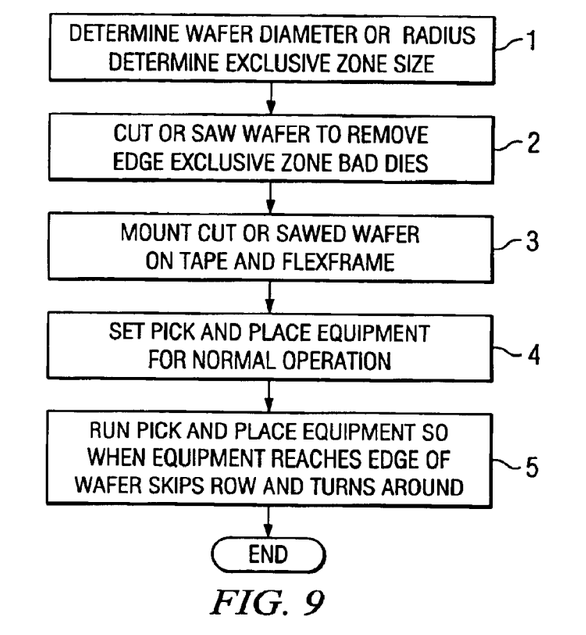
FIG. 9 is a flow diagram of Method 2 according to a second embodiment of the present invention.

FIG. 9 illustrates Method 2 in accordance with one embodiment of the present invention.

Figure 10:
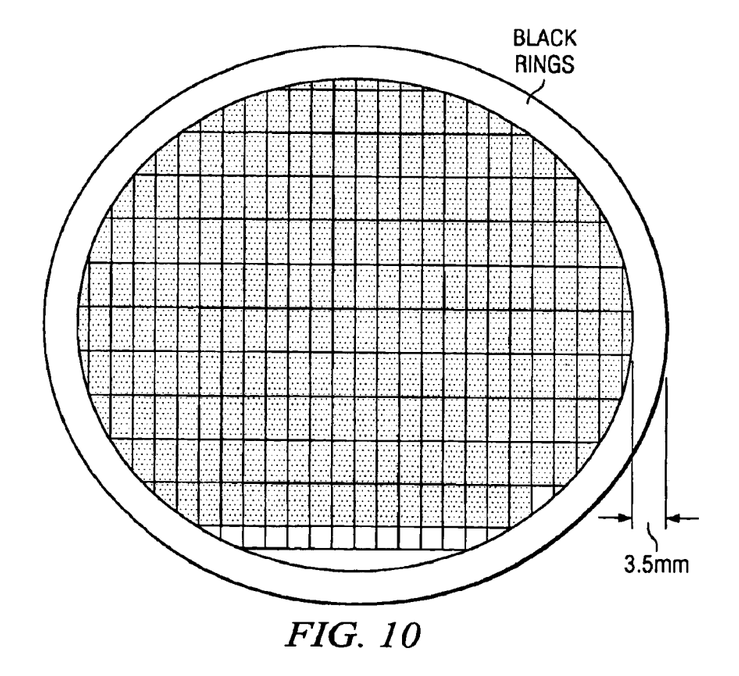
FIG. 10 illustrates by the black ring the edge exclusive zone of bad edge dies as determined in Step 1 of the Method 2.

Step 1 determines the following two information items are required before processing a wafer:
1 Wafer diameter (for example 150 mm or 200 mm).
2. Edge exclusive zone size in mils or mm from edge of wafer to an inner circle where good dies begin. For the example of 150 mm diameter wafer the zone of the bad dies is 3.5 mm wide. FIG. 10 illustrates by the black ring the edge exclusive zone of bad edge dies as determined.

Figure 11:
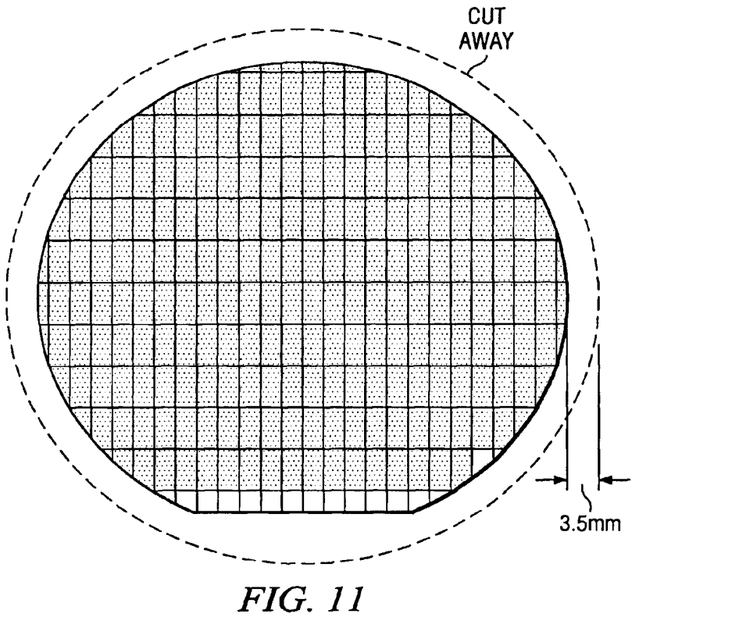
FIG. 11 illustrates the cut or sawed wafer in such a way that all of the edge exclusive zone bad dies are eliminated.

Step 2 is to cut or saw the wafer in such a way that all of the edge exclusive zone bad dies in the black ring are eliminated. The cutter or saw cuts off the black ring areas that is 3.5 mm wide. See FIG. 11.

Step 3 is to mount wafer on tape and flex frame as in the normal process.

Step 4 is to set up the pick and place equipment for normal pick and place operation.

Figure 12:
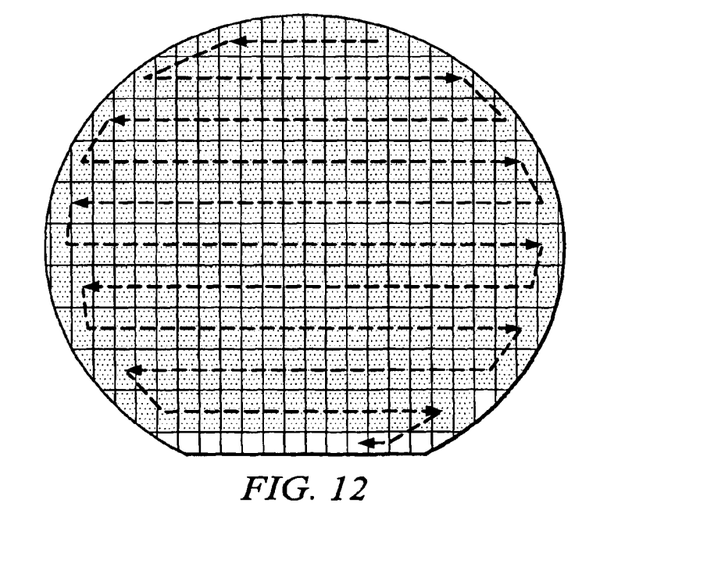
FIG. 12 illustrates the running of the pick and place equipment as normal picking up the good dies at the edge.

Step 5 is to run the pick and place equipment as normal. Since all the edge ink or bad edge zone dies were removed, the pick and place equipment will not pick bad edge dies and will pick up good dies. Whenever the pick and place equipment reaches the edge of the cut wafer, the vision system in the pick and place equipment recognize the edge and skips to the next row and reverses direction (skip/turnaround the row/column. Follow the dashed lines and arrows in FIG. 12.

Step 6 END

The three types of wafers can be processed by the above methods 1 and 2. The equipment is set to pick all dies not in the edge exclusive zone and not to pick any mirror or plug dies. The edge dies are either masked or cut away. For the Type II wafers the edge is eliminated by the mask or cut away and the inked dies in the center are not picked up. For the Type III wafers the non-inked dies that are not mirror or plug dies are picked up.

Figure 13:
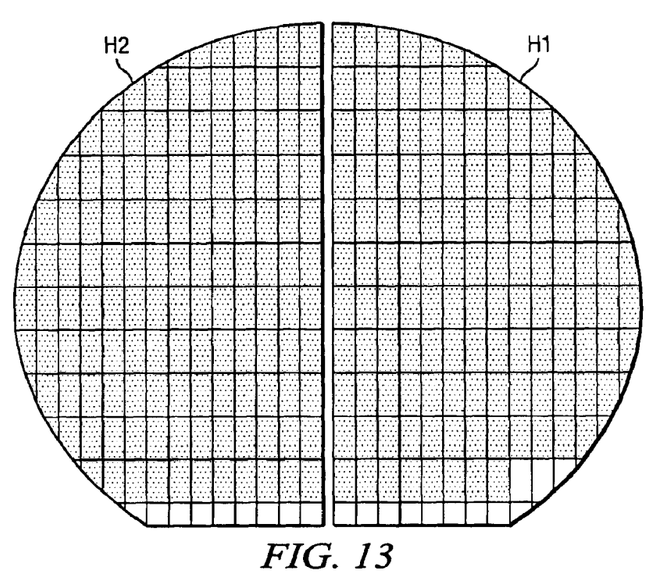
FIG. 13 illustrates half wafers.
Figure 14:
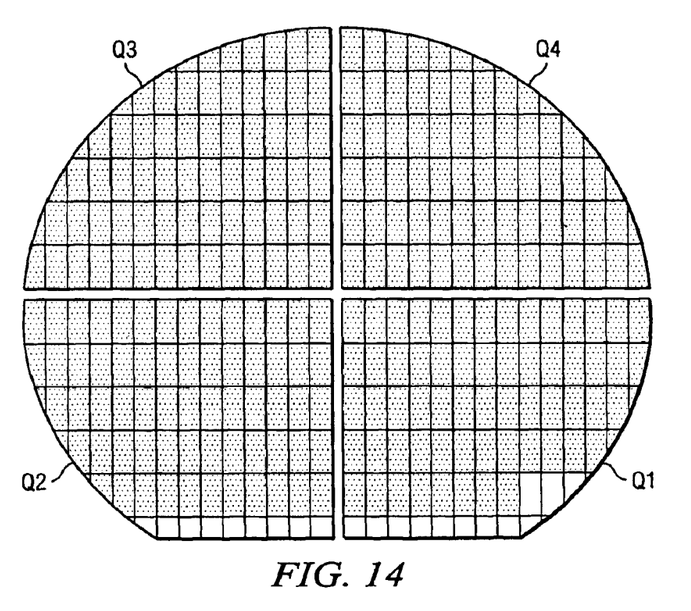
FIG. 14 illustrates quarter wafers.

The blind assembly process also works for partial wafers. The wafers can be a half (FIG. 13) or quarters (FIG. 14) for example. The edge exclusive zone paper mask can be fitted over a half or quarter edge of a half or quarter wafer to cause the pick and place to see the black mask and skip the edge dies as in the case of a full wafer. The ring may be a semicircular ring of black paper for half wafers or quarter ring for quarter wafers. Similarly the edge dies can be cut away as in Method 2.

Figure 15:
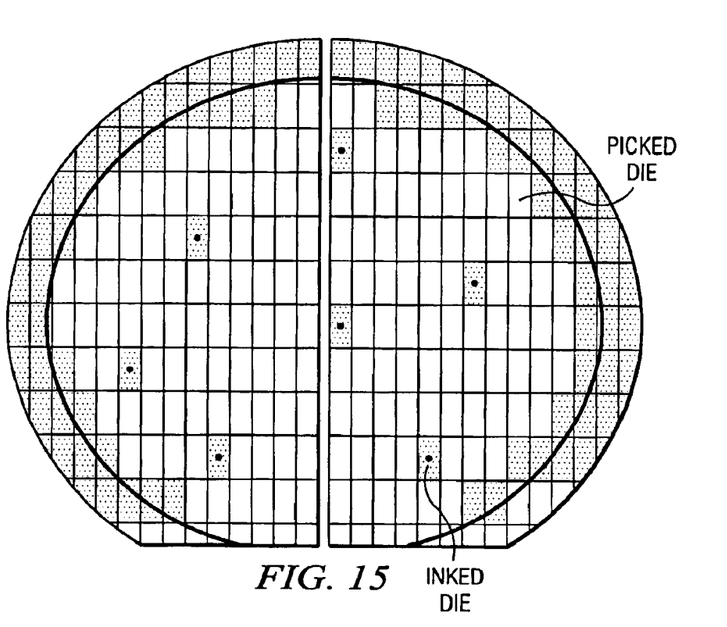
FIG. 15 illustrates half wafers after pick and place for Type II wafers.

FIG. 15 illustrates shows the half wafer after pick and place for Type II wafers. The dark circle 101 represents the inner edge of the bad die edge exclusive zone where the cut is made for Method 2 or the inner edge of the paper mask in Method 1. The paper mask would cover the zone from the dark circle 101 to the outer edge of the wafer. The pick and place equipment with the ink reject on will not pick up the die in the edge exclusive zone or the inked dies in the inner non-edge zone but will pick up the good dies.

Figure 16:
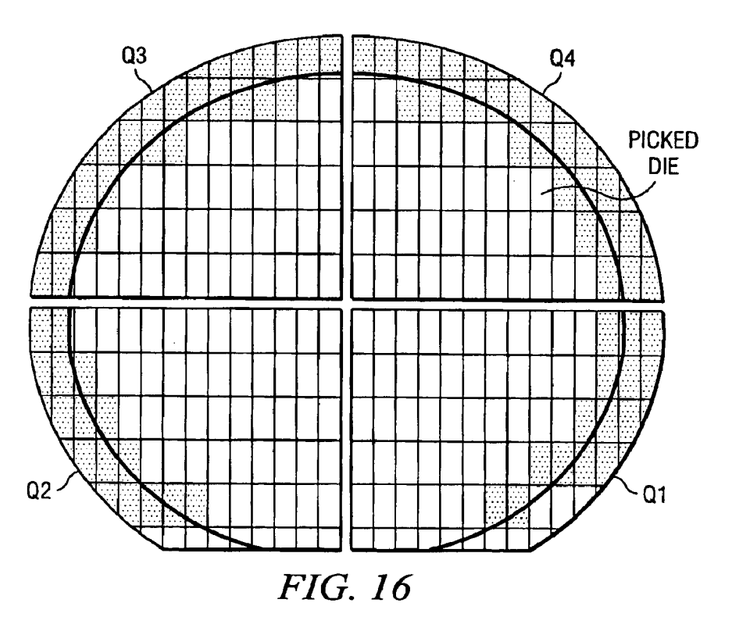
FIG. 16 illustrates quarter wafers after pick and place for Type I wafers.

FIG. 16 illustrates the quarter wafers after pick and place equipment has removed the dies. The bad dies in the edge exclusive zone near the edge of the wafer outside the circle 103 are not removed but are covered by the black paper mask or cut away.

While the invention has been described with reference to two embodiments, it will be apparent by those skilled in the art that various changes and detail may be made therein without departing from the spirit and scope of the invention.

What is claimed is:

1. A method of blind assembly processing a wafer by pick and place equipment comprising the steps of:
    determining the wafer diameter or radius and determining bad die edge exclusive zone size from the outer edge of wafer to an inner circle where good dies may be located; and
    using the determined wafer diameter or radius and bad die exclusive zone size, changing all of said bad die exclusive edge zone of said wafer so as not to pick up dies in the edge exclusive zone.

2. The method of claim 1 including the step of running the pick and place equipment such that whenever the pick and place equipment reaches the edge exclusive zone the pick and place equipment recognize the altering of the exclusive edge zone and skip/turnaround the row/column pickup.

3. The method of claim 2 including the step of mounting said wafer on tape and flex frame before running the pick and place equipment.

4. The method of claim 1 wherein said changing step includes masking said bad die exclusive zone with a material such that a vision system in the pick and place equipment recognizes the mask as an ink dot or no die or partial die and skip/turnaround the row/column.

5. The method of claim 1 wherein said changing step includes cutting or sawing the wafer in such a way that all of the edge exclusive zone bad dies are eliminated.

6. A method of blind assembly processing a wafer by pick and place equipment comprising the steps of:
 determining the wafer diameter or radius and determining bad die edge exclusive zone size from edge of wafer to an inner circle where good dies may be located;
 forming a ring of clean room black paper mask on said wafer in such a way that the paper masks the bad die edge exclusive zone;
 enabling the ink dot detection on pick and place equipment; and
 running the pick and place equipment such that whenever the pick and place equipment reaches the edge of the paper mask, the vision system in the pick and place equipment recognizes the mask as an ink dot or no die or partial die and skip/turnaround the row/column.

7. The method of claim 6 wherein said forming step includes cutting clean room black paper using said determined diameter or radius and bad die exclusive edge zone size.

8. The method of claim 7 wherein said forming step includes sticking said paper mask on said wafer.

9. The method of claim 6 wherein said forming step includes sticking said paper mask on said wafer using tape.

10. A method of blind assembly processing a wafer by pick and place equipment comprising the steps of:
 determining the wafer diameter or radius and determining edge exclusive zone size from edge of wafer to an inner circle where good dies may be located;
 using the determined diameter or radius and edge exclusive zone, cutting or sawing the wafer in such a way that all of the edge exclusive zone bad dies are eliminated;
 mounting cut or sawed wafer on tape and flex frame;
 setting up the pick and place equipment for normal pick and place operation; and running the pick and place equipment as normal and since all the edge ink or bad zone dies were removed, the pick and place equipment will not pick bad edge dies.

11. A method of blind assembly processing a partial wafer by pick and place equipment comprising the steps of:
 determining the partial wafer diameter or radius and determining bad die edge exclusive zone size from the outer edge of the partial wafer to a partial inner circle where good dies may be located; and
 using the determined partial wafer radius and bad die exclusive zone size, changing all of said bad die exclusive edge zone of said wafer so as not to pick up dies in the bad die edge exclusive zone.

12. The method of claim 11 including the step of running the pick and place equipment such that whenever the pick and place equipment reaches the edge exclusive zone the pick and place equipment recognize the altering of the exclusive edge zone and skip/turnaround the row/column pickup.

13. The method of claim 12 including the step of mounting said partial wafer on tape and flex frame before running the pick and place equipment.

14. The method of claim 11 wherein said changing step includes masking said bad die exclusive zone with a material such that a vision system in the pick and place equipment recognize the mask as an ink dot or no die or partial die and skip/turnaround the row/column.

15. The method of claim 11 wherein said changing step includes cutting or sawing the partial wafer in such a way that all of the edge exclusive zone bad dies are eliminated.

* * * * *